United States Patent
Millar et al.

(10) Patent No.: US 10,248,750 B2
(45) Date of Patent: Apr. 2, 2019

(54) POWER SAVINGS METHOD IN A CLOCK MESH-BASED DESIGN THROUGH A SMART DECLONING TECHNIQUE

(71) Applicant: Samsung Electronics Co., Ltd., Suwon-si, Gyeonggi-do (KR)

(72) Inventors: Brian Millar, Austin, TX (US); Suhail Ahmed, Austin, TX (US); Rajesh Kashyap, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 181 days.

(21) Appl. No.: 14/993,040

(22) Filed: Jan. 11, 2016

(65) Prior Publication Data
US 2016/0328507 A1   Nov. 10, 2016

Related U.S. Application Data

(60) Provisional application No. 62/156,811, filed on May 4, 2015.

(51) Int. Cl.
*G06F 17/50* (2006.01)
*G06F 1/10* (2006.01)

(52) U.S. Cl.
CPC ............ *G06F 17/5045* (2013.01); *G06F 1/10* (2013.01); *G06F 17/5081* (2013.01); *G06F 2217/62* (2013.01)

(58) Field of Classification Search
CPC ....................................................... G06F 17/50

USPC ......................................................... 716/108
See application file for complete search history.

(56) References Cited

U.S. PATENT DOCUMENTS

| | | | |
|---|---|---|---|
| 7,795,943 B2 | 9/2010 | Toyonoh et al. | |
| 8,384,436 B2 | 2/2013 | Peng | |
| 2005/0268258 A1* | 12/2005 | Decker | G06F 17/5081 716/104 |
| 2014/0176215 A1 | 6/2014 | Ahmed et al. | |

* cited by examiner

*Primary Examiner* — Bryce M Aisaka
(74) *Attorney, Agent, or Firm* — Renaissance IP Law Group LLP

(57) ABSTRACT

According to one general aspect, a method may include receiving a digital circuit model. The digital circuit model may include models of a clock mesh configured to provide a clock signal to a plurality of logic circuits, and a plurality of logic circuits, each logic circuit at least partially controlled by an application of the clock signal to one or more clock-gater cells. The method may include identifying a group of clock-gater cells having common input signals. The method may include calculating at least one clustered sub-portion of the group of clock-gater cells based upon a set of bounding dimensions, wherein each clustered sub-portion includes a plurality of clock-gater cells. The method may further include, for each clustered sub-portion, de-cloning in the digital circuit model the clock-gater cells by reducing the clock-gater cells to a new clock-gater cell and replacing the each clock-gater cell with a matching buffer cell.

20 Claims, 10 Drawing Sheets

200

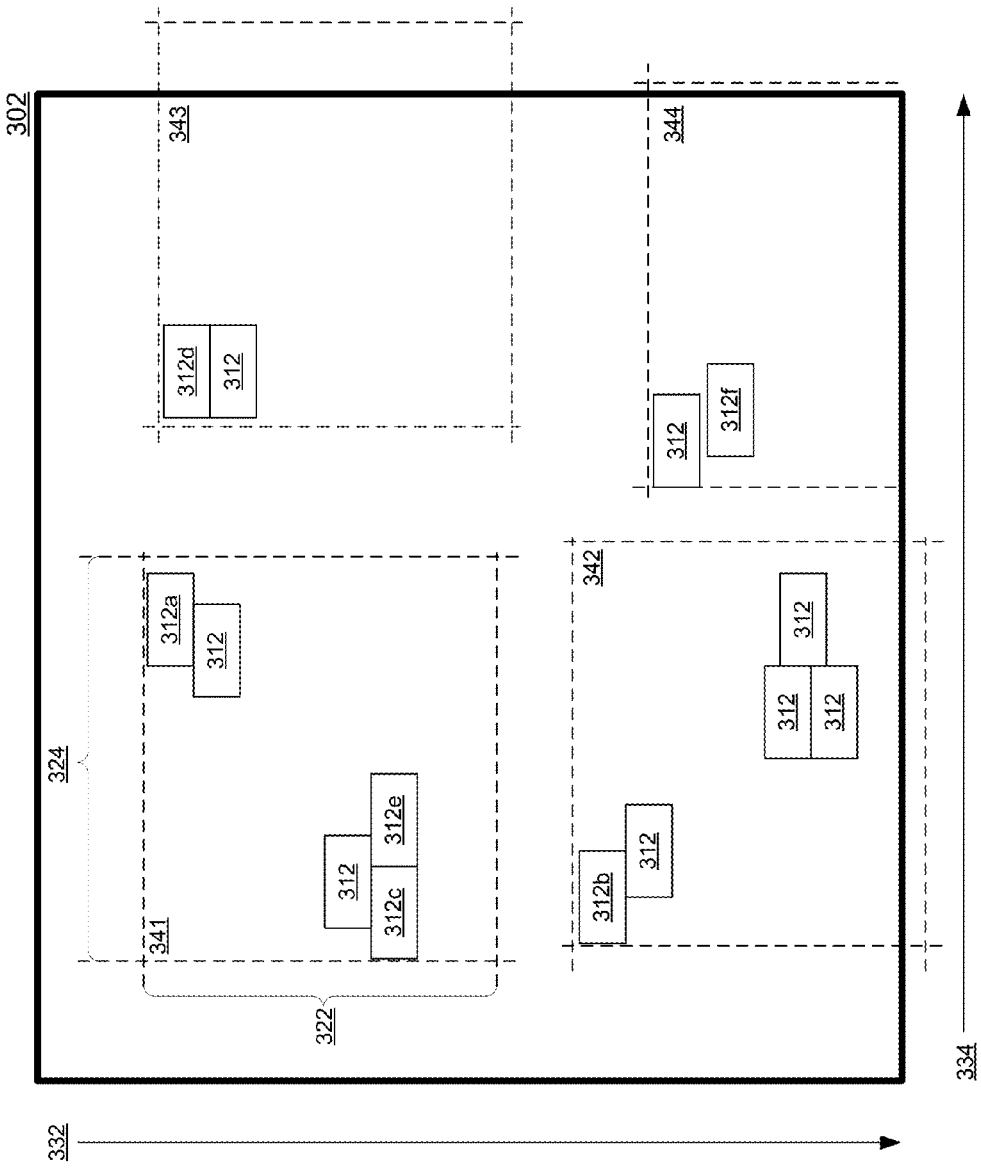

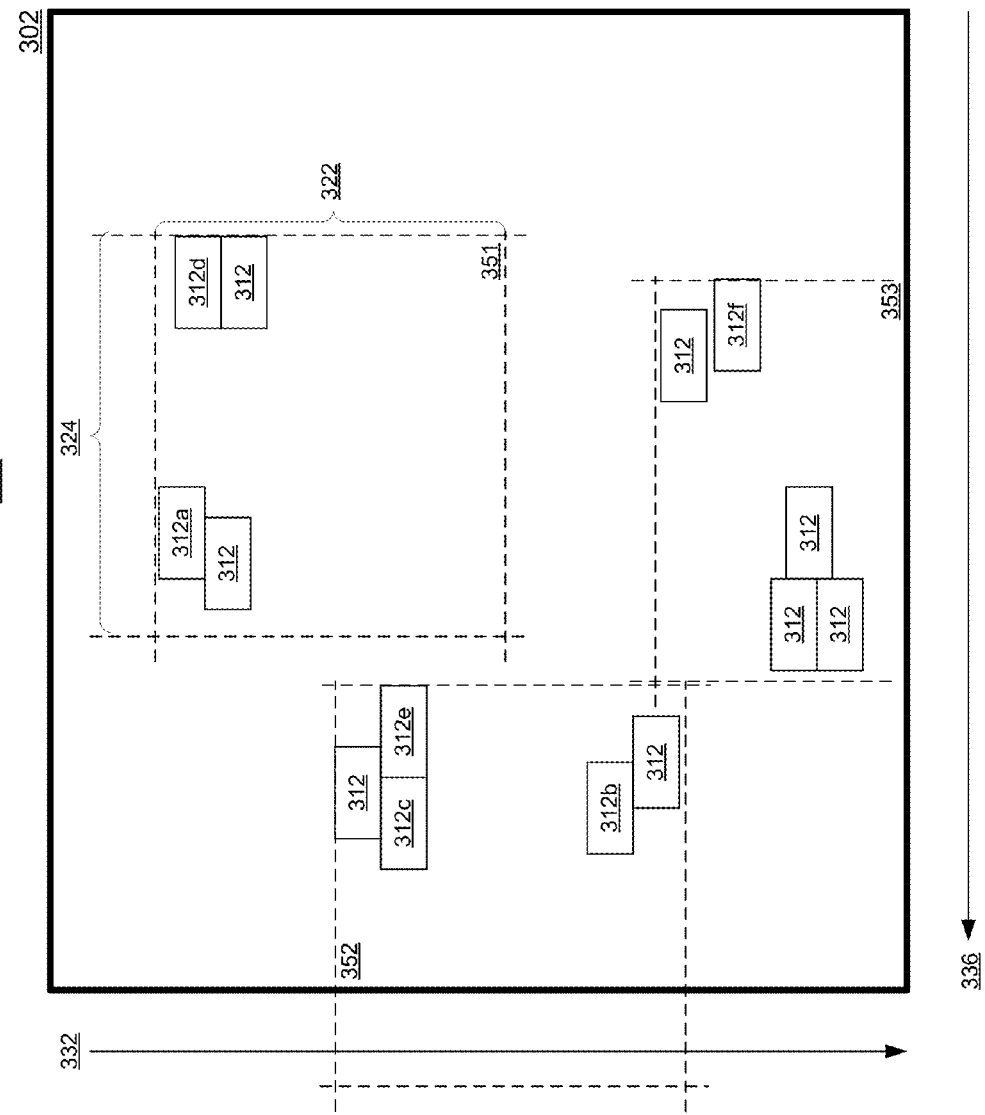

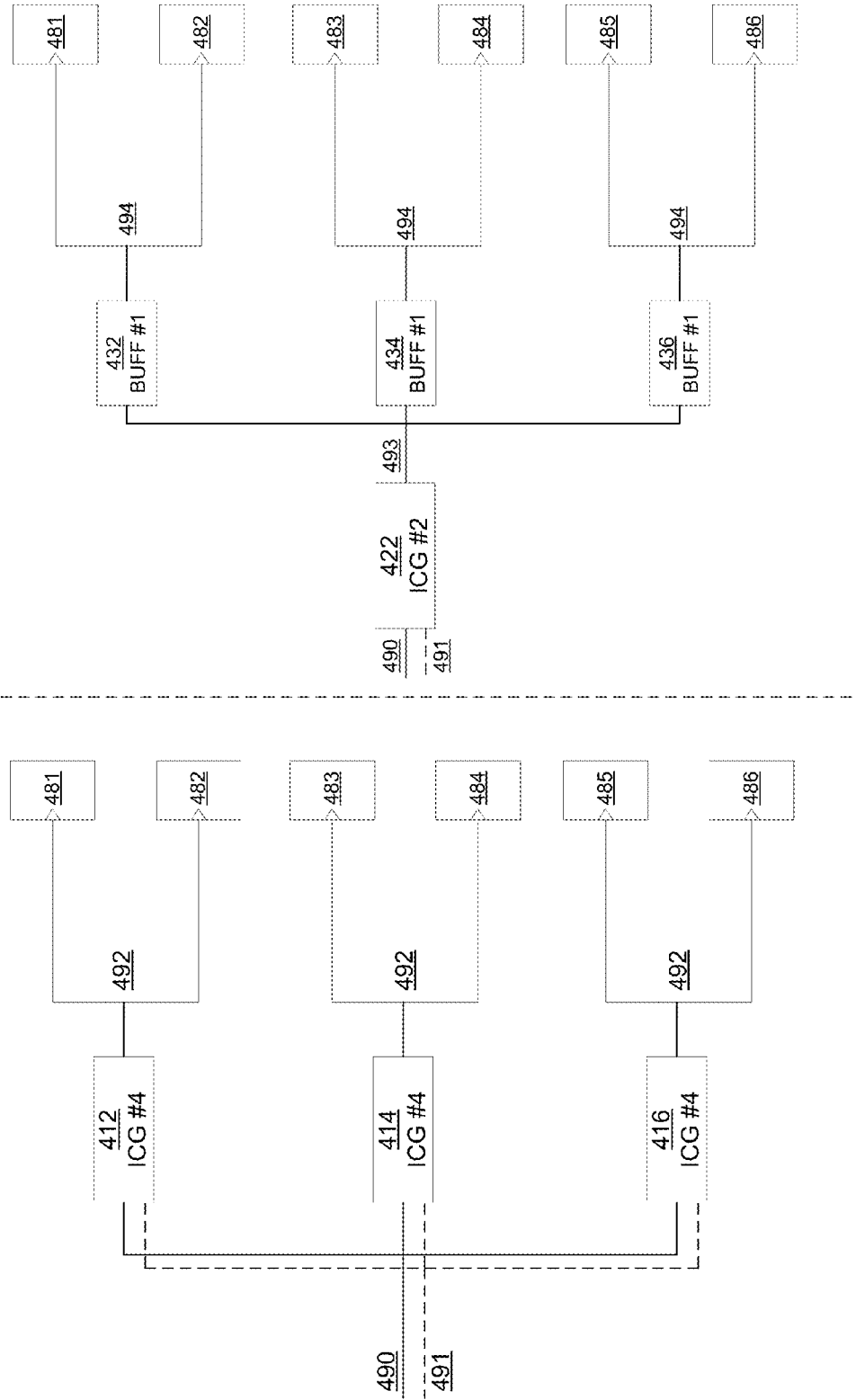

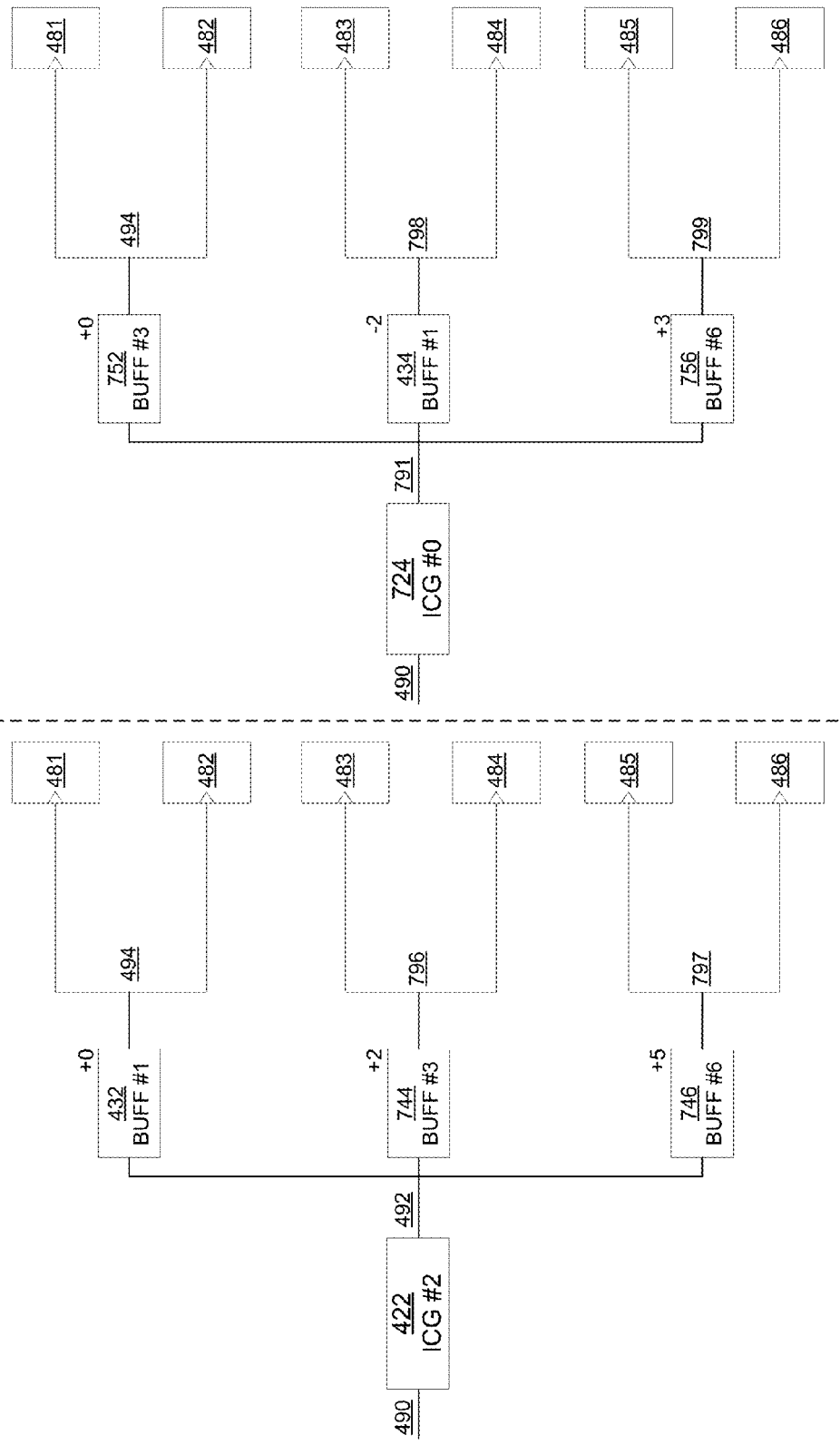

`US 10,248,750 B2`

POWER SAVINGS METHOD IN A CLOCK MESH-BASED DESIGN THROUGH A SMART DECLONING TECHNIQUE

CROSS-REFERENCE TO RELATED APPLICATION

This application claims priority under 35 U.S.C. § 119 to Provisional Patent Application Ser. No. 62/156,811, entitled "POWER SAVINGS METHOD IN A CLOCK MESH-BASED DESIGN THROUGH A SMART DECLONING TECHNIQUE" filed on May 4, 2015. The subject matter of this earlier filed application is hereby incorporated by reference.

TECHNICAL FIELD

This description relates to the design of electrical circuits, and more specifically to the timing of a clock network.

BACKGROUND

The operation of most digital circuit systems, such as computer systems, is synchronized by a periodic signal known as a "clock" that dictates the sequence and pacing of the devices of the circuit. Often, this clock is distributed from a single source to all the memory elements of the circuit, which are also called registers, latches, flip-flops, or memories. In a circuit using edge-triggered flip-flops, when the clock edge or tick arrives at a flip-flop, the flip-flop transfers the flip-flop input to the flip-flop output, and these new output values flow through combinational logic to provide the values at a next flip-flop's inputs for the next clock tick.

Ideally, the input to each memory element reaches its final value to be computed in time for the next clock tick so that the behavior of the whole circuit can be predicted exactly. The maximum speed or clock frequency at which a system may run generally accounts for the variance that occurs between the various elements of a circuit due to differences in physical composition, temperature, and path length.

In circuit designs, clock skew (sometimes called timing skew) is a phenomenon in synchronous circuits in which the clock signal (sent from the clock circuit) arrives at different components at different times. Occasionally, this may be caused by many different things, such as wire-interconnect length, temperature variations, variation in intermediate devices, capacitive coupling, material imperfections, differences in input capacitance on the clock inputs of devices using the clock, random and systemic variation and clock jitter, etc. As the clock rate of a circuit increases, timing becomes more critical and less variation can be tolerated if the circuit is to function properly.

Generally, there are two types of clock skew: negative latency (pull) and positive latency (push). Positive skew occurs when the receiving flip-flop receives the clock tick later than the sending flip-flop. Negative skew is the opposite: the receiving register gets the clock tick earlier than the sending register. Zero clock skew refers to the arrival of the clock tick substantially simultaneously at transmitting and receiving register.

SUMMARY

According to one general aspect, a method may include receiving a digital circuit model. The digital circuit model may include models of a clock mesh configured to provide a clock signal to a plurality of logic circuits, and a plurality of logic circuits, each logic circuit at least partially controlled by an application of the clock signal to one or more clock-gater cells. The method may include identifying a group of clock-gater cells having common input signals. The method may include calculating at least one clustered sub-portion of the group of clock-gater cells based upon a set of bounding dimensions, wherein each clustered sub-portion includes a plurality of clock-gater cells. The method may further include, for each clustered sub-portion, de-cloning in the digital circuit model the clock-gater cells by reducing the number of clock-gater cells to a new clock-gater cell and replacing each clock-gater cell with a matching buffer cell.

According to another general aspect, an apparatus may include a digital circuit receiver configured to receive a digital circuit model comprising models of: a clock mesh configured to provide a clock signal to a plurality of logic circuits, and a plurality of logic circuits, each logic circuit at least in partially controlled by an application of the clock signal to one or more clock-gater cells. The apparatus may include a cluster analyzer configured to:

identify a group of clock-gater cells having common input signals, and calculate at least one clustered sub-portion of the group of clock-gater cells based upon a set of bounding dimensions, wherein each clustered sub-portion includes a plurality of clock-gater cells. The apparatus may include a clock-gater de-cloner configured to, for each clustered sub-portion, de-clone in the digital circuit model the clock-gater cells by reducing the number of clock-gater cells to a new clock-gater cell and replacing each clock-gater cell with a matching buffer cell.

According to another general aspect, a computer program product for de-cloning clock-gater cells of a digital circuit model may exist. The computer program product may be tangibly embodied on a computer-readable medium and comprising executable code that, when executed, is configured to cause a data processing apparatus to receive a digital circuit model. The digital circuit model may include models of: a clock mesh configured to provide a clock signal to a plurality of logic circuits, and a plurality of logic circuits, each logic circuit at least in partially controlled by an application of the clock signal to one or more clock-gater cells. The executable code may, when executed, cause a data processing apparatus to identify a group of clock-gater cells having common input signals. The executable code may, when executed, cause a data processing apparatus to calculate at least one clustered sub-portion of the group of clock-gater cells based upon a set of bounding dimensions, wherein each clustered sub-portion includes a plurality of clock-gater cells. The executable code may, when executed, cause a data processing apparatus to, for each clustered sub-portion, de-clone in the digital circuit model the clock-gater cells reducing the number of clock-gater cells to a new clock-gater cell and replacing each clock-gater cell with a matching buffer cell.

The details of one or more implementations are set forth in the accompanying drawings and the description below. Other features will be apparent from the description and drawings, and from the claims.

A system and/or method for the design of electrical circuits, and more specifically to the timing of a clock network, substantially as shown in and/or described in connection with at least one of the figures, as set forth more completely in the claims.

BRIEF DESCRIPTION OF THE DRAWINGS

FIG. 3a is a block diagram of an example embodiment of a system in accordance with the disclosed subject matter.

FIG. 3b is a block diagram of an example embodiment of a system in accordance with the disclosed subject matter.

FIG. 4 is a block diagram of an example embodiment of systems in accordance with the disclosed subject matter.

FIG. 7 is a block diagram of an example embodiment of systems in accordance with the disclosed subject matter.

Like reference symbols in the various drawings indicate like elements.

DETAILED DESCRIPTION

Figure 1:
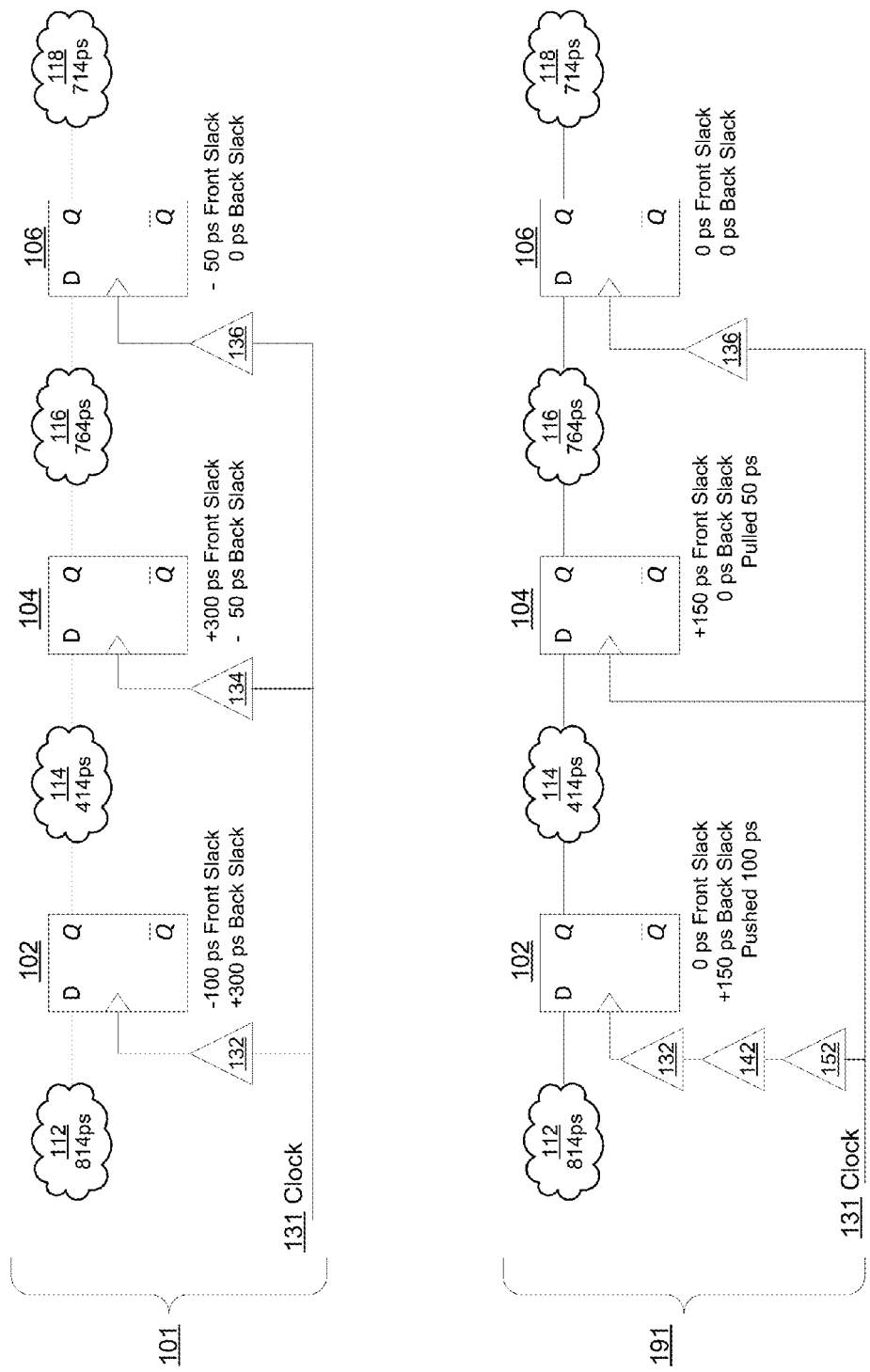
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. The illustrated embodiment shows a simplified example of non-useful or harmful clock skew and the amelioration thereof. In various embodiments, the amelioration of the clock skew may be accomplished via the disclosed subject matter.

In the illustrated embodiment, the system 100 may include three flip-flops (or more generally "end-points") 102, 104, and 106. The system 100 may also include four combinatorial logic portions 112, 114, 116, and 118. In various embodiments, the combinatorial logic portions may include various electrical circuits, such as, for example NAND gates, NOR gates, capacitors, resistors, etc.). It may take a certain amount of time for an input to the combinatorial logic to be processed and to result in an output to the combinatorial logic portion.

As described above, if this processing time is less than the period of the clock signal 131, than the circuit is said to have "positive slack". Conversely, if the processing time is greater than the period of the clock signal 131, than the circuit is said to have "negative slack", and more importantly, the outputs will not be ready when the flip-flop associated with the outputs stores the output signals. In various embodiments, this may be ameliorated by increasing the clock period or decreasing the clock frequency.

In the illustrated embodiment, the clock period is 714 picoseconds (ps) or a frequency of ~1.4 gigahertz (GHz). In the illustrated embodiment, the combinatorial logic 112 may take 814 ps to process. Therefore, the flip-flop 102 may have a front slack or frontwards slack of −100 ps (i.e., 714 ps−814 ps), as flip-flop 102 is logically in front-of or after the combinatorial logic 112. The clock signal may then be thought to arrive at the flip-flop 102 100 ps before the outputs of the combinatorial logic section 112 are ready or fully computed.

In the illustrated embodiment, the combinatorial logic 114 may take 414 ps to process. Therefore, the flip-flop 102 may have a back slack or backwards slack of +300 ps (i.e., 714 ps−414 ps), as it is in back-of or behind the combinatorial logic 114. This means that flip-flop 102 could release the input signals 300 ps later than the inputs are currently released, and the combinatorial logic section 114 would still have enough time to fully compute the output values. The flip-flop 104 may have a front slack or frontwards slack of +300 ps (i.e., 714 ps-414 ps).

It is understood that the examples described herein are merely a few illustrative examples to which the disclosed subject matter is not limited. For example, these examples have been simplified for illustrative purposes and do not include things like clock jitter, setup time, etc.

In the illustrated embodiment, the combinatorial logic 116 may take 764 ps to process. Therefore, the flip-flop 104 may have a back slack of −50 ps (i.e., 714 ps−764 ps) and the flip-flop 106 may have a front slack −50 ps (i.e., 714 ps−764 ps). In the illustrated embodiment, the combinatorial logic 118 may take 714 ps to process. Therefore, the flip-flop 106 may have a back slack of 0 ps (i.e., 714 ps−714 ps). It is understood that the above is merely one illustrative example to which the disclosed subject matter is not limited.

Likewise, in the illustrated embodiment, the clock network or clock mesh may include the clock signal 131, and a number of buffers or drivers 132, 134, and 136. In the illustrated embodiment, each buffer may delay the clock signal 131 by 50 ps. It is understood that the above is merely one illustrative example to which the disclosed subject matter is not limited.

As described above, in the original state (state 101), the system 100 has two flip-flops or end-points that are considered to have negative (front) slack, flip-flops 102 and 106. The failure of the logic 112 and 116 in front of these two flip-flops 102 and 106, causes the system 100 to not be able to meet its design goal of operating at 1.4 GHz, as a clock period of 814 ps (instead of the desired 714 ps) is needed to fully process the slowest logic portion (circuit 112).

FIG. 1 also shows the system 100 after the clock network has been altered or adjusted according to the disclosed subject matter (state 191). In such an embodiment, buffers have been added or removed from the clock network to increase (push) or decrease (pull) the clock latency experienced by each flip-flop. This adjustment of the clock latency, in turn, means that not all of the combinatorial logic portions (e.g., logic 112, etc.) are subjected to a strict 714 ps execution time. Instead, a given logic portion may have more time (e.g., 814 ps, etc.) or less time (e.g., 414 ps, etc.). In reference to the other figures, the technique employed, in various embodiments, to adjust the clock latency is described in greater detail. In the illustrated embodiment, the concept alone is introduced.

In the illustrated embodiment, the clock signal to the flip-flop 102 may be delayed 100 ps by the addition of two buffers (buffers 142 and 152). This may push the end of the execution time for the logic 112 out by 100 ps, giving it a full 814 ps to complete. This may result in the flip-flop 102 having a front slack of 0 ps.

However, pushing the clock to flip-flop 102 100 ps is not done in isolation. It also means the start of the next pipeline stage or combinatorial logic 114 is also pushed 100 ps. Fortunately, the logic 114 only needs 414 ps to complete and the delay is not a problem. The addition of the buffers 142 and 152 may give the flip-flop 104 a front slack of +200 ps.

But, the logic 112 may not have been the only problematic portion, in the illustrated embodiment. Combinatorial logic 116 may also exceeded the desired 714 ps period with a computation time of 764 ps. In various embodiments, it may be desirable to make use of the excess slack available to flip-flop 104 to remove some strain on the logic 116.

In such an embodiment, the clock latency to the flip-flop 104 may be decreased or pulled. In one such embodiment, the buffer 134 may be removed from the clock network. This may cause the amount of time the logic 116 has to perform its computation to increase by 50 ps, or a total time of 764 ps. In such an embodiment, the flip-flop 104 may then have a front slack of +150 ps, and a back slack of 0 ps. Likewise, the flip-flop 106 (which has not had its clock latency pushed or pulled) may have a front slack of 0 ps and a back slack of 0 ps.

In another embodiment, if the logic 118 had had a processing time less than 714 ps (e.g., 614 ps), the clock latency of flip-flop 106 may have been pushed to accommodate the logic 116. In such an embodiment, the clock latency to flip-flop 104 may not have pulled. It is understood that the above is merely one illustrative example to which the disclosed subject matter is not limited.

In the illustrated embodiment, the clock signal 131 and buffers 132, 134, 136, 142, and 152 may be part of a clock mesh network. Generally, a clock mesh network is characterized by an extremely shallow logic depth between the mesh and the flip-flops or end-points. Usually just a single buffer (e.g., buffer 132, etc.) or clock gate directly drives the electrical sinks or end-points. This compares to a more conventional clock tree, which is often characterized by an organic tree structure from the clock root, that branches out to each of the sinks in the design. In a clock tree scheme there is often a relatively large depth for both buffer and clock-gating levels. This lack of depth in the number of buffers between the end-point and the root source of the clock signal 131 in a clock mesh network, reduces the opportunities for managing clock skew, specifically the opportunity for pulling the clock latency.

In the illustrated embodiment, each buffer (e.g., buffer 142, buffer 134, etc.) may cause a delay to the clock signal 131 of 50 ps. In various embodiments, the disclosed subject matter may be configured to operate using quantized amounts to push or pull the clock skew. In such an embodiment, it may not be possible to adjust the clock latency to a specific desired value (e.g., 800 ps) but only to a value close to the desired value as dictated by the granularity of the quantized amount (e.g., 814 ps, 764 ps, etc.). It is understood that in various embodiments the levels of quantization may change (e.g., 40 ps, 100 ps, 15 ps, etc.). It is understood that the above are merely a few illustrative examples to which the disclosed subject matter is not limited.

Figure 2:
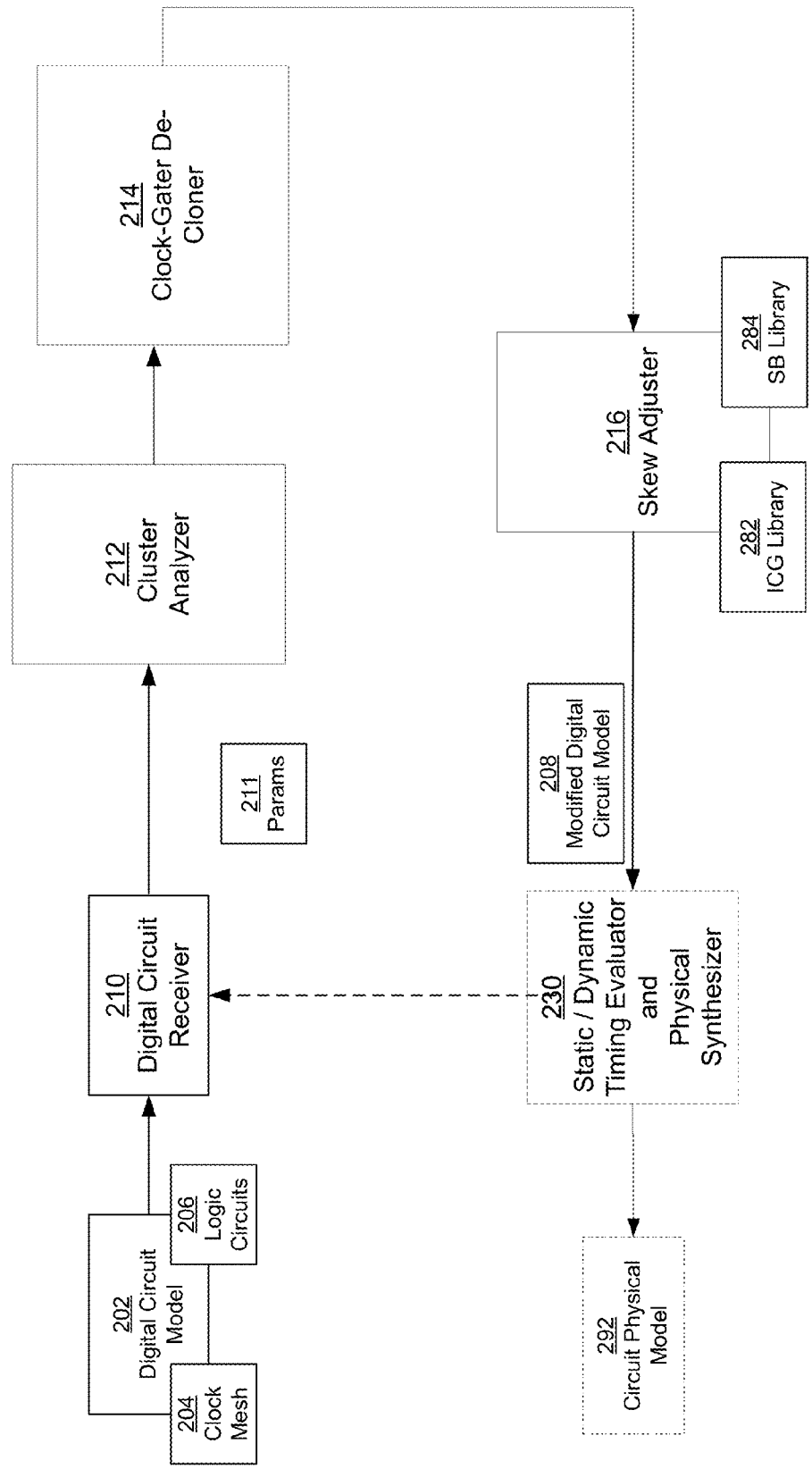
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, during the integrated circuit design process, a digital circuit model 202 may be created. It may be desirable to adjust the number of clock or clock-related elements (e.g., clock gaters, buffers, etc.) of the digital circuit model 202 and/or adjust the clock skew of various elements of the digital circuit model 202. The components of system 200 may be employed to adjust the clock elements of the model 202 as described below.

In the illustrated embodiment, the system 200 may be employed to adjust the digital circuit model 202 before performing physical circuit synthesis or subjecting the model 202 to more rigorous timing evaluation techniques. In another embodiment, the system 200 may be employed to adjust the clock skew of the model 202 (or resulting modified digital circuit model 208) late in the design process (e.g., as late as final timing, etc.). In various embodiments, by running a digital circuit model 202 through the system 200 late in the design process, one may benefit from being able to use the most accurate timing in order to fix the truly most critical paths, and make the most optimum Power-vs-Performance tradeoffs. It is understood that the above is merely one illustrative example to which the disclosed subject matter is not limited.

In one embodiment, the system 200 may receive a digital circuit model 202. In various embodiments, the digital circuit model 202 may include a physically synthesized, or laid out model. In another embodiment, the model 202 may include a representation of the circuit intermediate to the two ends of the design process. It is understood that the above are merely a few illustrative examples to which the disclosed subject matter is not limited.

In various embodiments, the circuit model 202 may include a clock mesh 204 (or a representation thereof). In such an embodiment, the clock mesh 204 may be configured to provide a clock signal to a plurality of logic circuits 206. In such an embodiment, the clock signal may arrive at each logic circuit 206 with a respective amount of clock latency, as described above.

In various embodiments, the circuit model 202 may include a plurality of logic circuits 206, as described above. In some embodiments, each logic circuit 206 may be at least partially controlled by the clock signal to one or more end-points of the respective logic circuit 206. In this context, an end-point may include a flip-flop, latch, or other register or state device (e.g., the flip-flops of FIG. 1, memories, etc.). In various embodiments, an end-point may mark the beginning/ending of a pipeline stage.

Further, in various embodiments, the circuit model 202 may include a plurality of clock elements that delay or gate the clock signal for a number of logic circuit 206 and/or end-points. In some embodiments, the clock elements may include delay elements such as the buffers or drivers of FIG. 1. In another embodiment, clock elements may include gating elements, such a clock gaters. In such an embodiment, a clock gater may include a gating element that turns on or off a clock signal based upon some enabling signal. In various embodiments, this may allow relatively large (or small) portions of the logic circuits 206 to be temporarily disabled or "put to sleep". In some embodiments, the portions may be sized based upon functional unit blocks (FUBs) or execution units, such as, for example, floating-point units, arithmetic logic units, etc. In another embodiment, the portions may be smaller sections of a larger execution unit. It is understood that the above are merely a few illustrative examples to which the disclosed subject matter is not limited.

In one embodiment, the system 200 may include a digital circuit receiver 210. The digital circuit receiver 210 may be configured to receive the digital circuit model 202. In various embodiments, the digital circuit receiver 210 may also be configured to receive one or more parameters 211. In some embodiments, these parameters 211 may include one or more of: an first or X maximum distance, a second or Y maximum distance, a sweep direction or sequence, one or more timing or delay parameters, etc. In various embodiments, these parameters 211 may be input into another component (e.g., the cluster analyzer 212, the clock-gater de-cloner 214, the skew adjuster 216, etc.). It is understood that the above are merely a few illustrative examples to which the disclosed subject matter is not limited.

In various embodiments, the system 200 may include a cluster analyzer 212. In some embodiments, the cluster analyzer 212 may be configured to identify a group of clock-gater cells having common input signals. In various embodiments, two or more clock gater elements may receive the same clock and enable signals, or more generally the same inputs. In such an embodiment, those clock gaters may be considered to be logically equivalent. They may differ in terms of placement, timing, etc., but from a Boolean logic perspective, they may be equivalent. In one simple embodiment, the cluster analyzer 212 may group those clock gater together as a cluster of clock gaters that are candidates for de-cloning.

In more complex embodiments, the cluster analyzer 212 may group logically equivalent clock gaters together into clusters based upon additional criteria. For example, as described below in reference to FIGS. 3a and 3b, the cluster analyzer 212 may be configured to consider the physical placement and spacing of the logically equivalent clock-gaters when grouping them into clusters. In such an embodiment, the clock analyzer 212 may be configured to create or identify multiple clusters from the logically equivalent clock-gaters. In such an embodiment, the cluster analyzer 212 may be configured to calculate at least one clustered sub-portion of the group of clock-gater cells based upon a set of bounding dimensions.

In some embodiments, a bounding dimension or area may be employed to group or cluster clock-gater cells together. For example, clock-gater cells within a same cluster may be allowed to only be a certain distance away from each other. In another embodiment, clock-gater cells within a same cluster may be required to fit within a moving window or bounding area. In some embodiments, the cluster analyzer 212 may be configured to perform multiple passes or scans on the circuit model 202 in order to minimize or reduce the number of clusters formed or identified. In some embodiments, each of those passes may occur in various orders or directions, as described below. It is understood that the above are merely a few illustrative examples to which the disclosed subject matter is not limited.

FIG. 3a is a block diagram of an example embodiment of a system 300 in accordance with the disclosed subject matter. In the illustrated embodiment, the system 300 illustrates an example of how a cluster analyzer (e.g., cluster analyzer 212 of FIG. 2) may group logically equivalent clock gaters together into clusters. In the illustrated embodiment, a circuit 302 may be represented by a circuit model.

Within the circuit 302 may be a plurality of logically equivalent integrated clock-gaters (ICGs) 312.

In the illustrated embodiment, the cluster analyzer may be configured to identify clusters based upon two or more parameters. The first parameter may be a first or Y bounding dimension 322. In such an embodiment, the Y bounding dimension 322 may dictate a maximum distance (in the Y axis or direction) between two ICGs 312 that are within the same cluster (e.g., cluster 341, etc.). Likewise, a second parameter may be a second or X bounding dimension 324. In such an embodiment, the X bounding dimension 324 may dictate a maximum distance (in the X axis or direction) between two ICGs 312 that are within the same cluster. In such an embodiment, taken together the Y and X bounding dimensions 322 & 324 may define a moving window in which a cluster of ICGs 312 must fit. Any ICGs 312 outside of this window may be considered to be part of another cluster.

Further, in various embodiments, a third parameter may be a scanning or sweeping direction or sequence. For example, in the rectangular circuit 302, the moving window may be swept in one of 8 possible patterns (e.g., left to right, then bottom to top; left to right, then top to bottom; bottom to top, then left to right; top to bottom, then right to left; etc.). In the illustrated embodiment, the sweeping sequence is illustrated by parameter 332 that dictates that sweeping is to occur from top to bottom, and by parameter 334 that dictates that sweeping is to occur from left to right. In the illustrated embodiment, the Y axis may be swept first, then the X axis. In some embodiments, the cluster analyzer may sweep through all or a pre-defined sub-set of sweeping sequences. In yet another embodiment, the sweeping sequence may include three parameters, an X axis direction, a Y axis direction, and an axis priority parameter. It is understood that the above are merely a few illustrative examples to which the disclosed subject matter is not limited.

In the illustrated embodiment, the cluster analyzer may be configured to sweep the moving window (as defined by bounding dimensions 322 and 324) from the top of the circuit 302 towards the bottom. When an ICG 312 is encountered (e.g., ICG 312a), the moving window (or at least the start point of the Y dimension 322) may "hang" and a height of a cluster may be defined (by the Y dimension 322). When that height is exceeded, and a new ICG 312 (e.g., ICG 312b) is encountered, another or second cluster area may be defined. This may occur multiple times.

Likewise, as the circuit 302 is scanned or swept from left-to-right, when an ICG 312 is encountered (e.g., ICG 312c), the moving window (or at least the start point of the X dimension 324) may "hang" and a width of a cluster may be defined. This may occur a number of times and the intersection of these heights and widths may define bounding boxes for a number of clusters.

In the illustrated embodiment, four clusters have been defined, clusters 341, 342, 343, and 344. In various embodiments, the defined bounding area of a cluster may exceed the bounds of the circuit 302 (e.g., cluster 343, etc.), but as the cluster bounds are merely for grouping or conceptual purposes this may not matter.

FIG. 3b is a block diagram of an example embodiment of a system 301 in accordance with the disclosed subject matter. In the illustrated embodiment, the system 300 illustrates an example of how a cluster analyzer (e.g., cluster analyzer 212 of FIG. 2) may group logically equivalent clock gaters together into clusters. In the illustrated embodiment, a circuit 302 may be represented by a circuit model.

Within the circuit 302 may be a plurality of logically equivalent integrated clock-gaters (ICGs) 312.

System 301 illustrates an example in which the Y bounding dimension 322 and the X bounding dimension 324 are, respectively, the same as in the example of FIG. 3a. However, the scanning sequence is from right to left (parameter 336) and then top to bottom (parameter 332). In such an embodiment, this may lead to different clusters being defined or identified.

The cluster analyzer may be configured to sweep from the right edge of circuit 302, stopping when an ICG 312 is encountered (e.g., ICG 312d) and defining a width of a cluster. As described above, this may also occur from the top to the bottom, defining heights of various clusters. In such an embodiment, three clusters may be defined, clusters 351, 352, and 353.

In the illustrated embodiment, it can be seen that by varying or altering the scanning sequence or order, the number of clusters may change. In various embodiments, it may be desirable to reduce the number of clusters identified. In such an embodiment, the amount of ICG de-cloning accomplished by the system may be increased.

In some embodiments, the cluster analyzer may be configured to sweep or scan in a plurality of directions or sequences. In various embodiments, for each direction set or sequence, the cluster analyzer may count a number of potential clustered sub-portions associated with the direction set. The cluster analyzer may then determine a direction set with a fewest number of potential clustered sub-portions. The cluster analyzer may determine that the potential clustered sub-portions associated with that determined direction sequence will be used as the clusters for the rest of the de-cloning process. In such an embodiment, the cluster analyzer may be configured to determine a minimal cluster set or number.

Returning to FIG. 2, in the illustrated embodiment, the system 200 may include a clock-gater de-cloner 214. In such an embodiment, the clock-gater de-cloner 214 may be configured to de-clone (in the digital circuit model 202) each of the clock-gater cells by replacing multiple clock gater cells into one clock gater cell, and buffers where the original gater cells existed.

In such an embodiment, de-cloning may include replacing a plurality of clock-gater cells within an identified cluster, with a single clock-gater cell. Cloned or duplicated clock-gater cells have a negative impact on the circuit due to increased power consumption. For example, a large number of clock-gater cells increase the pin capacitance of the clock mesh. Also, internal cell power increases as the number of clock-gater cells increases. By de-cloning or reducing the number of clock-gater cells, power consumption of the clock network may be reduced.

However, often clock-gaters are cloned as a way to meet skew or transition timing targets. Therefore, by de-cloning clock-gater cells, any skew or transition timing issues may return to the circuit model 202. In various embodiments, de-cloning may also include adding a buffer or driver for each of the replaced clock-gater cells that allows the circuit to meet any skew or transition timing targets. It is understood that the above are merely a few illustrative examples to which the disclosed subject matter is not limited.

In the illustrated embodiment, by limiting or constraining the de-cloning process to the identified clusters, the replacement clock-gater cell (and therefore power switching) may still be physically near the affected logic gates or end-points. In some embodiments, the new clock-gater cell may be placed substantially at a delay-weighted geometric center of the replaced clock-gater cells or their matching buffer cells. In such an embodiment, the variance across process-voltage-temperature (PVT) instances or corners may be reduced. In the illustrated embodiment, a similar physical structure to the original one of the circuit model 202 may be maintained through the de-cloning process.

The illustrated embodiment has the advantage of power reduction within a mesh-based design, while keeping the footprint compatible useful skew structure intact, preserving tracking across all PVT corners, and maintaining the physical proximity to power switches to control instance voltage drop (IVD) impact. Also, with a reduction of ICGs, the timing stress on ICG enable paths may be reduced without the need to implement a clock tree based structure to drive a larger and distributed load. In some embodiments, this may also reduce the amount of logic in the enable path, which may reduce the amount of power consumed. In some embodiments, additional parameters may be employed, such as cluster size, wire length, etc. Further, unwanted skew may be adjusted for via cluster identification parameters or further skew adjustment, as described below. It is understood that the above are merely a few illustrative examples to which the disclosed subject matter is not limited.

FIG. 4 is a block diagram of an example embodiment of systems 400 & 401 in accordance with the disclosed subject matter. FIG. 4 shows an example of how a cluster or plurality of ICGs may be de-cloned. In such an embodiment, a clock signal 490 may be input to the cluster. Further, an enable signal 491 may also be input to the cluster. Ultimately, the clock signal 490 (in gated form in response to enable signal 491) may drive the end-points 481, 482, 483, 484, 485, and 486. It is understood that the above is merely one illustrative example to which the disclosed subject matter is not limited.

In system 400, the clock signal may be gated or controlled by the ICGs 412, 414, and 416. As described above, these three ICGs 412, 414, and 416 may be logically equivalent, and produce three versions of the gated clock signal 492. The three gated clock signals 492 may, in turn, drive the end-points 481, 482, 483, 484, 485, and 486. In such an embodiment, the three ICGs 412, 414, and 416 may be grouped as a cluster.

In system 401, the three ICGs 412, 414, and 416 may be removed from the system. In the illustrated embodiment, a new or replacement ICG 422 may be added to the system 401 to provide the same clock gating function as the removed ICGs 412, 414, and 416. In such an embodiment, the gated clock signal 493 (output from ICG 422) may be logically equivalent to the gated clock signals 492 (output from ICGs 412, 414, and 416 of system 400). However, the gated clock signal 493 may not be equivalent to the signals 492 in terms of its timing. Therefore, additional alterations to the circuit model may be included in the de-cloning process.

Further, in such an embodiment, the ICGs 412, 414, and 416 may be replaced with three skew buffers (SBs) 432, 434, and 436. In various embodiments, these skew buffers 432, 434, and 436 (in combination with the new or replacement ICG 422) may provide the same amount of latency and skew as the system 400, such that the signals 494 are logically and temporally equivalent to signals 492 of system 400. In such an embodiment, the ICGs and skew buffers may be footprint compatible so that the layout of the circuit model may not be altered by the substitution of the ICGs with their respective skew buffers.

In the illustrated embodiment, the pin capacitance directly on the mesh between systems 400 and 401 may have been reduced from three (ICGs 412, 414, and 416) to one (ICG 422). Likewise, the internal power consumption of the clock gating latch (or other switching element) of the ICGs may be reduced from three to one. It is understood that the above is merely one illustrative example to which the disclosed subject matter is not limited.

In the specific example, when the system 400 is "off" the three ICGs 412, 414, and 416 consume internal power (i.e., the internal logic used to enable/disable the clock gater cell) and there are three pin capacitances found on the mesh. Conversely, when the system 401 is "off" the one ICG 422 consumes internal power and there is only one pin capacitance on the mesh. Likewise, when the system 400 is "on" the three ICGs 412, 414, and 416 consume power due to the 12 buffers and 3 driver circuits that comprise the ICGs 412, 414, and 416 (4 buffers and 1 driver each). Conversely, when the system 401 is "on" the one ICG 422 consumes power due to 2 buffers and 1 driver, plus power is consumed from the skew buffers 432, 434, and 436 that each include 1 buffer and 1 driver (totaling 3 buffers and 3 drivers). It is understood that the above are merely a few illustrative examples to which the disclosed subject matter is not limited.

In the illustrated embodiment, the de-cloning process is discussed as including the removal of the old ICGs 412, 414, and 416, the addition of the new ICG 422, and the addition of the skew buffers 432, 434, and 436. However, it is understood that the de-cloning process is not limited to this example order of operations. For example, in one embodiment, de-cloning may include replacing the old ICGs 412, 414, and 416 with the skew buffers 432, 434, and 436, and then creating the new ICG 422. It is understood that the above are merely a few illustrative examples to which the disclosed subject matter is not limited.

Figure 5:
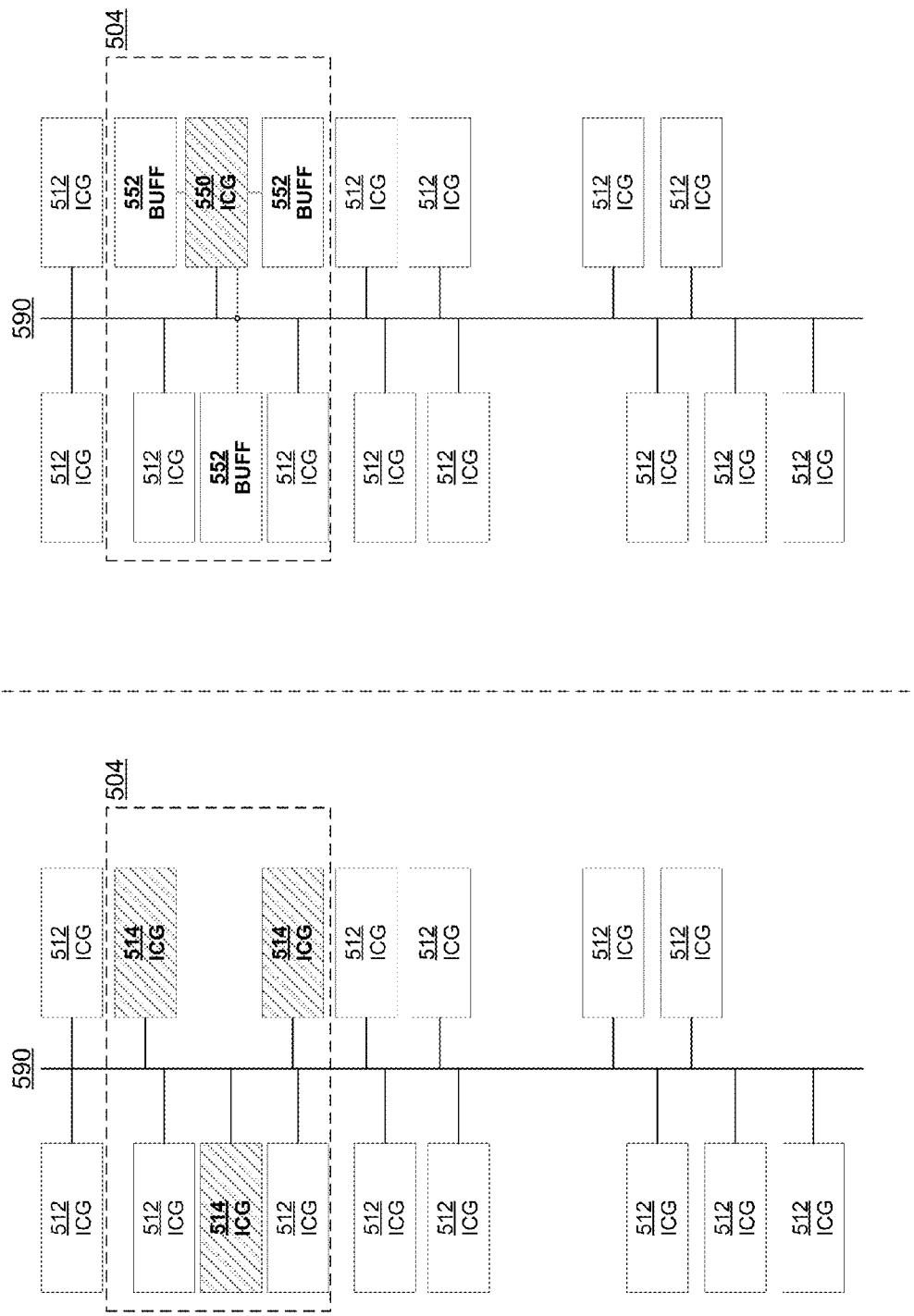
FIG. 5 is a block diagram of an example embodiment of systems in accordance with the disclosed subject matter.

FIG. 5 is a block diagram of an example embodiment of systems 500 and 502 in accordance with the disclosed subject matter. FIG. 5 may also show an example of how a cluster or plurality of ICGs may be de-cloned. While FIG. 4 illustrated the conceptual aspects of the de-cloning process, FIG. 5 illustrates the effect of de-cloning on the physical layout of the systems.

In such an embodiment, a clock signal 590 may be input to the systems as a whole. The systems 500 and 502 may include a number of ICGs 512 and 514. It is understood that the above is merely one illustrative example to which the disclosed subject matter is not limited.

In the illustrated embodiment of system 500, the ICGs 514 may be logically equivalent and grouped into the cluster 504. In such an embodiment, a number of ICGs (e.g., ICGs 512) may be laid out or physically placed within the bounds of the clusters 504, but as they are not logically equivalent to ICG 514. Specifically, they do not share the same enable signal and will not be considered for decloning with ICG 514, however they may be decloned with another ICG (e.g., ICG 512). Such consideration is not discussed herein.

As described above, in system 502 the ICGs 514 may be replaced with the skew buffers 552. In the illustrated embodiment, the skew buffers 552 may be placed in the same physical locations as the ICGs 514. In such an embodiment, the layout of the rest of the system 502 may not be affected by the cell replacement.

In the illustrated embodiment, the new ICG 550 may be added to system 502. In such an embodiment, the ICG 550 may be placed in an empty portion of the layout. In some embodiments, the new clock-gater cell may be placed substantially at a delay-weighted geometric center of the replaced clock-gater cells or their matching buffer cells. Again this may be so that the layout of the rest of the system 502 may not be affected by the cell addition. In such an embodiment, the clock signal 590 may be routed to the ICG 550, and the output of ICG 550 may be routed to the skew buffers 552 (illustrated by light grey lines), and the output of the skew buffers 552 may be routed to the logic circuits (not shown). In such an embodiment, the ICG 550 may be logically equivalent (e.g., having the same enable signal, etc.) as the ICG 514. It is understood that the above are merely a few illustrative examples to which the disclosed subject matter is not limited.

Returning to FIG. 2, in various embodiments, the system 200 may include a skew adjuster 216. In one such embodiment, the skew adjuster 216 may be configured to tune at least one clock related cell to adjust a useful skew of at least one matching buffer cell. In some embodiments, the skew adjuster 216 may be configured to employ techniques described above in reference to FIG. 1. It is understood that the above is merely one illustrative example to which the disclosed subject matter is not limited.

In various embodiments, the skew adjuster 216 may employ a library 282 of ICGs. In such an embodiment, the ICG library 282 may include a plurality of ICG cells. In the illustrated embodiment, each of the ICG variants may have the same physical footprint (i.e. length, width, pin locations, metal blockages, etc.), but different contents and different timings. In such an embodiment, one variant may be swapped or replaced with another variant without disrupting the physical layout of the circuit model 202. In such an embodiment, a model 208 output by the system 200 may not have to pass through a physical synthesis or layout portion of the design process, due to the change in ICG variants. In such an embodiment, the system 200 may accommodate timing adjustments to the model 202 (even a large amount of clock skew schedule adjustments) at any stage of the implemented design with minimal disruption.

In various embodiments and as described above, a clock-gater may include a circuit that, in addition to providing power and (possibly) delay for a clock signal, is configured to turn-off or gate a clock signal. Many integrated circuits achieve various low power modes by turning-off the clock to various portions of the chip when those portions are not needed or not being used. For example, if an integrated circuit is not performing floating-point computations, the floating-point unit (FPU) of the circuit may be temporarily turned off. When a floating-point instruction is detected by the integrated circuit, the clock to the FPU may be turned back on, and the FPU may operate normally. It is understood that the above is merely one illustrative example to which the disclosed subject matter is not limited.

As described below, an enable signal may be sent to an ICG to turn-off (or conversely, turn-on) the clock signal to the ICG cluster. In the illustrated embodiment, the skew adjuster 216 may be configured to adjust the selection of an ICG variant based upon the timing of the respective enable signal. In another embodiment, the selection of an enable-delayed variant of an ICG cell may be made by the skew adjuster 216. It is understood that the above are merely a few illustrative examples to which the disclosed subject matter is not limited.

Figure 6A:
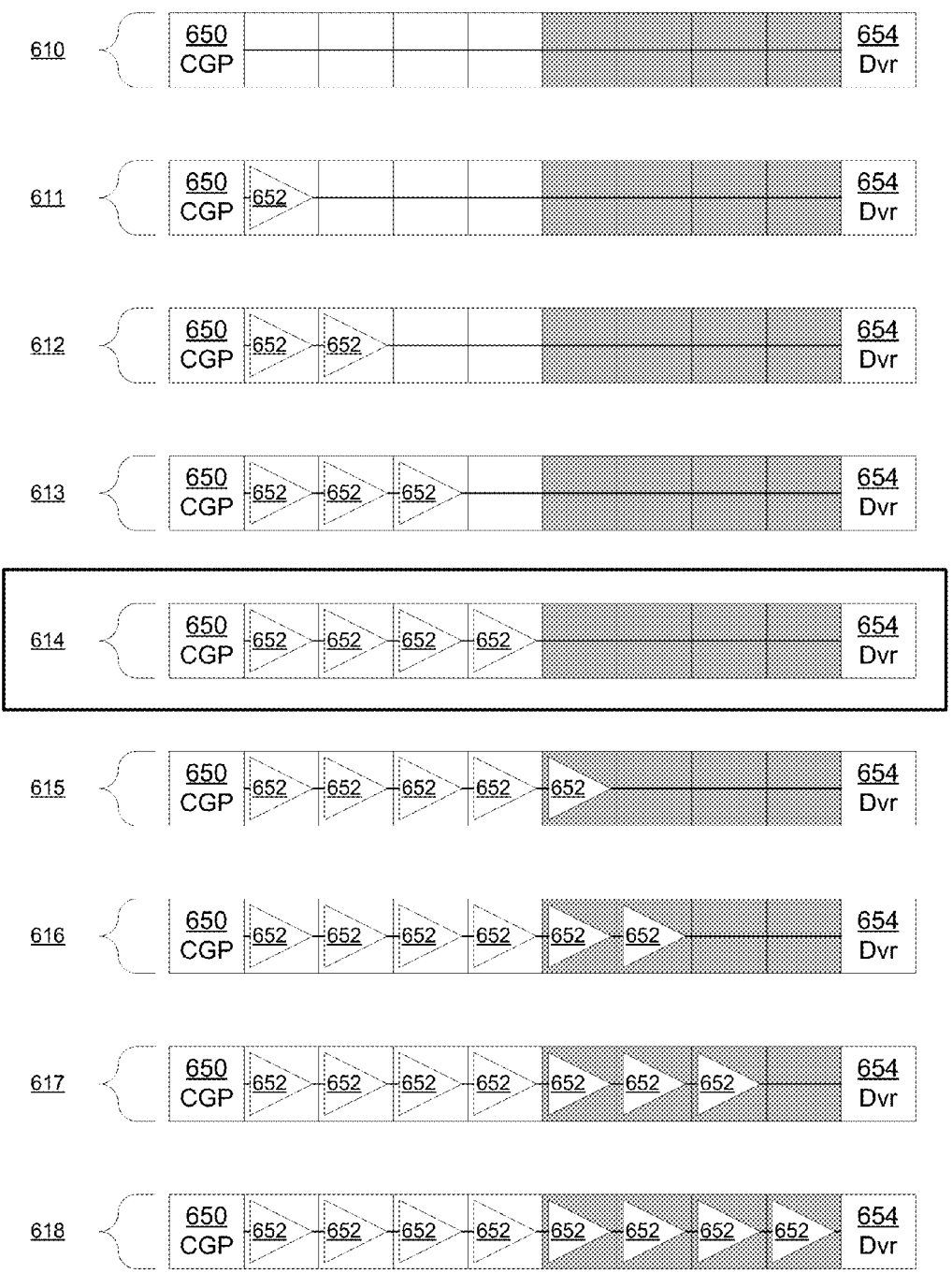
FIG. 6a is a block diagram of an example and conceptual embodiment of circuits in accordance with the disclosed subject matter.

As described above, the library 282 may include a plurality of ICG variants. FIG. 6a shows an embodiment of ICGs variants. It is understood that FIG. 6a is merely a few illustrative examples to which the disclosed subject matter is not limited. Further, it is understood that the circuits shown in FIG. 6a are merely conceptual and one skilled in the art would understand how to implement such conceptual designs. A further explanation of the ICG variants, or at least a basic straight-forward version of the ICG variants is described below in reference to FIG. 6a.

FIG. 6a is a block diagram of an example embodiment of circuits 600 in accordance with the disclosed subject matter. In the illustrated embodiment, nine variants of an ICG are shown. It is understood that the above are merely a few illustrative examples to which the disclosed subject matter is not limited.

In the illustrated embodiment, the ICG variants (e.g., ICG 610, 611, etc.) may each include an integrated clock-gater portion (CGP) 650. In such an embodiment, the CGP 650 may include a circuit (e.g., an AND gate, etc.) configured to gate or turn-off the clock signal and prevent it from propagating beyond the CGP 650.

In various embodiments, for portions of the digital circuit whose clock cannot be gated, the CGP 650 may receive a steady enable signal. In another embodiment, the CGP 650 may not be included in such variants, or may be replaced by skew-buffers (e.g., the skew-buffer variants of FIG. 6b, etc.). It is understood that the above are merely a few illustrative examples to which the disclosed subject matter is not limited.

In the illustrated embodiment, the ICG variants may each include a driver portion 654. In such an embodiment, the driver portion 654 may be configured to provide the clock signal with an appropriate amount of power to drive the associated end-points.

In the illustrated embodiment, the various ICG variants may include between zero to eight delay buffers 652. In such an embodiment, each delay buffer 652 may be configured to delay the clock signal by a pre-defined amount. In various embodiments, the pre-defined amount may be a defined push step value or the pull step value (e.g., 50 ps, 15 ps. etc.). As described above, the skew adjuster 216 of FIG. 2 may be configured to select one of the illustrated variants (or a similar variant for a given embodiment) based upon the desired amount of delay provided by the ICG variant. For example, if a greater amount of delay is desired, an ICG variant with a greater number of delay buffers 652 may be selected. If a smaller amount of delay is desired, an ICG variant with a fewer number of delay buffers 652 may be selected.

In the illustrated embodiment, variant 610 may include no or zero delay buffers 652 (and provide the least amount of delay or clock latency). Variant 611 may include one delay buffer 652. Variant 612 may include two delay buffers 652. Variant 613 may include three delay buffers 652. Variant 614 may include four delay buffers 652. Variant 615 may include five delay buffers 652. Variant 616 may include six delay buffers 652. Variant 617 may include seven delay buffers 652. Variant 618 may include eighth delay buffers 652. It is understood that the above are merely a few illustrative examples to which the disclosed subject matter is not limited.

In the illustrated embodiment, the variant 614 (a.k.a. ICG #4) may be the default or base variant. In such an embodiment, when the skew adjuster 216 of FIG. 2 wishes to increase or push the clock latency of a given cluster, it may select one of the variants with a greater delay than the four-delay variant 614 (e.g., variants 615, 616, 617, or 618). Conversely, when the skew adjuster 216 of FIG. 2 wishes to decrease or pull the clock latency of a given cluster, it may select one of the variants with a smaller delay than the four-delay variant 614 (e.g., variants 613, 612, 611, or 610). It is understood that the above is merely one illustrative example to which the disclosed subject matter is not limited.

In the illustrated embodiment, as described above, all of the variants of the ICG (e.g., variants 610, 611, 612, etc.) may all include the same physical footprint. In such an embodiment, the variants may be interchangeable from a layout perspective. In some such embodiments, variants in which less than eight delay buffers 652 are used (e.g., variant 610, etc.) may include unused space (as illustrated by the empty blocks). In various embodiments, the disclosed subject matter may be thought of as trading physical space for the modularity provided by the uniform physical footprint. As described above, this may facilitate changing the clock latencies of the circuit model at any stage of the implemented design with a minimal amount of disruption (e.g., re-synthesis, etc.).

Returning briefly to FIG. 2, in the illustrated embodiment, once the skew adjuster 216 has set a common push/pull schedule amount for the cluster, and inserted or replaced any ICGs, skew adjuster 216 may be configured to adjust one or more skew-buffers into the digital circuit model 202.

In such an embodiment, a variant of the skew-buffer may be chosen for a respective end-point based upon a difference between the skew schedule associated with the respective end-point and the common push/pull amount calculated for the cluster, as described above. In various embodiments, the variants may be selected from a skew buffer (SB) library 284.

Figure 6B:
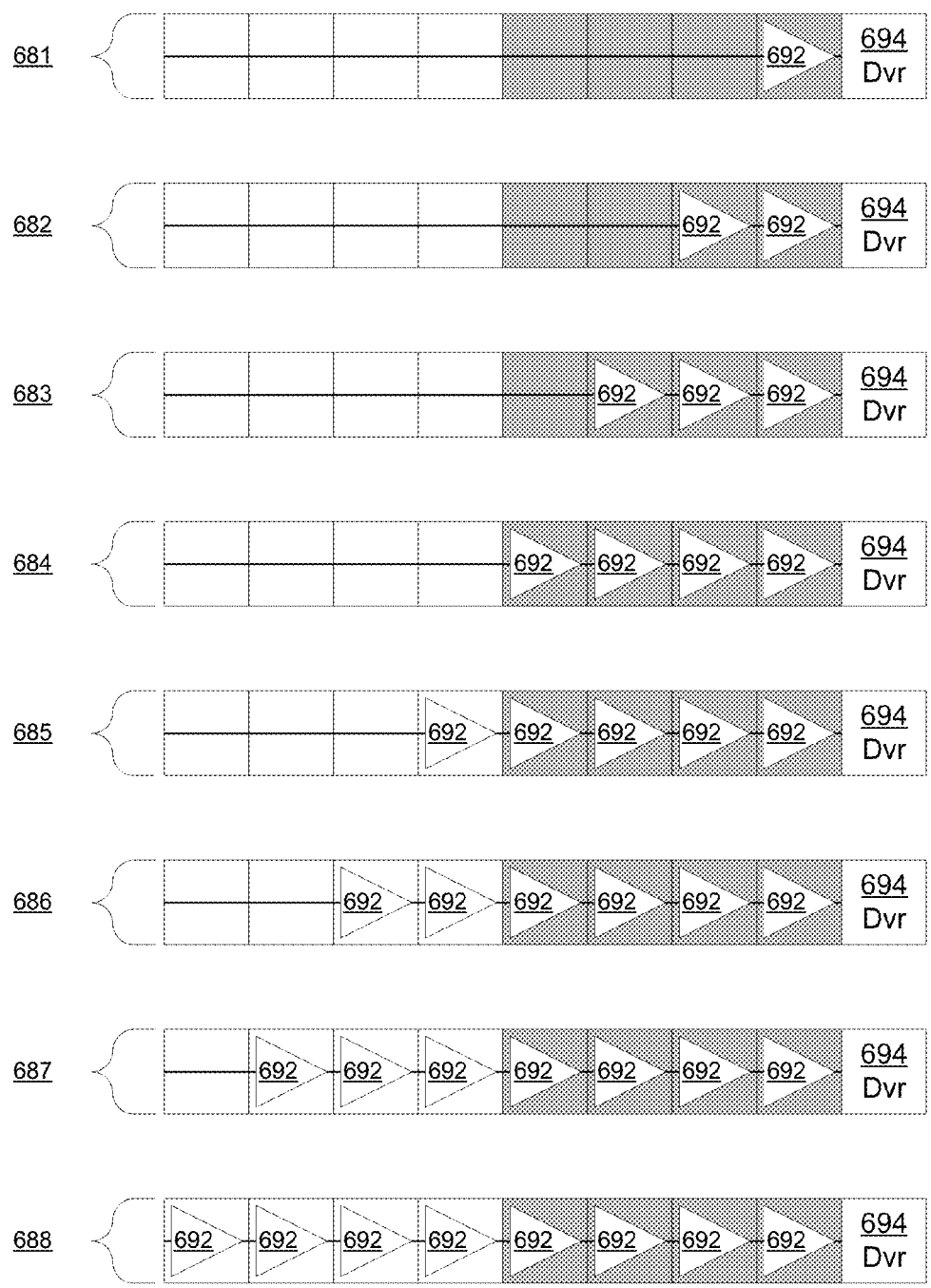
FIG. 6b is a block diagram of an example and conceptual embodiment of circuits in accordance with the disclosed subject matter.

As described above, the library 284 may include a plurality of SB variants. FIG. 6b shows a possible embodiment of such SB variants. It is understood that FIG. 6b is merely an illustrative example to which the disclosed subject matter is not limited. Further, it is understood that the circuits shown in FIG. 6b are merely conceptual and one skilled in the art would understand how to implement such conceptual designs. A further explanation of the SB variants, or at least a basic straight-forward version of the SB variants is described below in reference to FIG. 6b.

FIG. 6b is a block diagram of an example embodiment of circuits 604 in accordance with the disclosed subject matter. In the illustrated embodiment, eight variants of a SB are shown. It is understood that the above are merely a few illustrative examples to which the disclosed subject matter is not limited.

In the illustrated embodiment, the SB variants may each include a driver portion 694. In such an embodiment, the driver portion 694 may be configured to provide the clock signal with an appropriate amount of power to drive the associated end-points. In some embodiments, the driver portion 694 may be the same as the driver portion 654 of the ICGs of FIG. 6a.

In the illustrated embodiment, the various SB variants may include between one to eight delay buffers 692. In another embodiment, a zero-delay variant may be included. In such an embodiment, each delay buffer 692 may be configured to delay the clock signal by a pre-defined amount. In various embodiments, the pre-defined amount may be the push step value or the pull step value (e.g., 50 ps, 15 ps. etc.). As described above, the skew adjuster 216 of FIG. 2 may be configured to select one of the illustrated variants (or a similar variant for a given embodiment) based upon the desired amount of delay provided by the selected ICG variant and the skew associated with the respective end-point.

In the illustrated embodiment, variant 681 may include one delay buffer 692 (and provide the least amount of delay or clock skew). Variant 682 may include two delay buffers 692. Variant 683 may include three delay buffers 692. Variant 684 may include four delay buffers 692. Variant 685 may include five delay buffers 692. Variant 686 may include six delay buffers 692. Variant 687 may include seven delay buffers 692. Variant 688 may include eighth delay buffers 692. It is understood that the above are merely a few illustrative examples to which the disclosed subject matter is not limited.

In the illustrated embodiment, a skew-buffer with no delay buffers 692 is not shown. In some embodiments, a library of skew buffers may include such a skew buffer variant. This zero-delay variant may be similar to the zero-delay variant of the ICG (e.g., ICG 610 of FIG. 6a), but without the CGP 650. In some such embodiments, the zero-delay skew-buffer may be the default or base skew-buffer, such that all end-points are associated with a skew-buffer and more specifically, a cell with the same physical footprint as the other variants of the skew buffer (e.g., SB variants 681, 685, 688, etc.). In such an embodiment, the layout portion of the design process may account for a skew-buffer cell, and therefore the variants of the skew buffer cell may be replaced without affecting the circuit layout. However, in most embodiments, the addition of a "dummy" or place-holder SB may be deemed an excessive waste of area for the benefit of being able to replace skew buffers without affecting the circuit layout.

It is understood that delays caused by skew buffers may be used to replace ICG delays, as described above. In such an embodiment, any clock gating or enablement may be handled by the CGP portion of the decloned ICG.

As described above, in various embodiments, each variant of the skew-buffer may include the same physical footprint or size (e.g., length, width, pin locations, blockages, etc.). In such an embodiment, the combination of easily interchangeable ICGs and SBs, may enable a large amount of possible clock skews to be created or implemented at any stage of the design process with minimal disruption.

FIG. 7 is a block diagram of an example embodiment of systems 703 & 704 in accordance with the disclosed subject matter. FIG. 7 may show an example of how a cluster of de-cloned ICGs may be subsequently be skew adjusted in contrast to FIG. 4 which shows the same skew on all end-points. In such an embodiment, a clock signal 490 may be input to the cluster. Ultimately, the clock signal 490 (in gated form) may drive the end-points 481, 482, 483, 484, 485, and 486. It is understood that the above is merely one illustrative example to which the disclosed subject matter is not limited.

System 703 illustrates that, in one embodiment, a useful skew push may be implemented, using footprint compatible skew buffers (e.g., buffers 744 or 746). Previously in system 401 of FIG. 4 and again in system 703, a 2 delay ICG (ICG #2) 422 may be employed as the common or new ICG for the cluster. ICG 422 may then output the gated clock signal 492, as described above.

In the illustrated embodiment, the end-points 481 and 482 need not adjust their skew. In such an embodiment, the buffer 432 (BUFF #1) does not need to be adjusted (shown by the +0 next to buffer 432), and gated clock signal 494 may still be input into the end-points 481 and 482 (as in system 401 of FIG. 4).

However, the other end-points (e.g., end-point 483, etc.) may benefit from some skew adjustment. For example, the end-points 483 & 484 may benefit from being pushed 2 push steps (shown by the +2 next to buffer 744), and the end-points 485 & 486 may benefit from being pushed 5 push steps (shown by the +5 next to buffer 746).

In such an embodiment, the skew adjuster may replace the 1 push step delay buffer (BUFF #1) with a buffer having the desired amount of delay. For example, in the case of end-points 483 & 484, their associated 1 push step delay buffer may be replaced with a 3 push step delay buffer 744 (BUFF #3) that outputs signal 796. Likewise, in the case of end-points 485 & 486, their associated 1 push step delay buffer may be replaced with a 6 push step delay buffer 746 (BUFF #6) that outputs signal 797.

System 704 illustrates that, in one embodiment, both a useful skew push and a useful skew pull may be implemented, using footprint compatible skew buffers and/or ICGs. In the illustrated embodiment, the end-points 481 & 482 may desire no adjustment in their skew, as compared to system 401 of FIG. 4 (shown by the +0 next to buffer 752). The end-points 483 & 484 may desire that their skew be pulled by 2 pull steps, as compared to system 401 of FIG. 4 (shown by the −2 next to buffer 754). Finally, the end-points 485 & 486 may desire that their skew be pushed by 3 pull steps, as compared to system 401 of FIG. 4 (shown by the +3 next to buffer 756)

Previously in system 401 of FIG. 4 and again in system 703, a 2 delay ICG (ICG #2) 422 was employed as the common or new ICG for the cluster. However, in system 704 as there is a need to pull the clock signal for end-points 483 & 484. The new or common ICG may be replaced with an ICG having less delay. In the illustrated embodiment, an ICG of zero delay (ICG #0) has been selected and ICG 724 is made the new common ICG, and outputs signal 791, which has been pulled by 2 pull steps compared to signal 492 of system 703.

In the illustrated embodiment, the end-points 481 and 482 may not need the adjustment of their skew. However, since the signal 791 has been pulled by 2 pull steps, a skew buffer is needed to add 2 push steps to skew (resulting in a net pull/push adjustment of zero). In such an embodiment, the 1 delay buffer (BUFF #1) may be replaced by a 3 delay buffer 752 (BUFF #3), and gated clock signal 494 (or a signal substantially equivalent) may still be input into the end-points 481 and 482 (as in system 401 of FIG. 4).

However, the other end-points (e.g., end-point 483, etc.) may need some skew adjustment. For example, the end-points 483 & 484 may require being pulled 2 skew steps. In such an embodiment, as the signal 791 has already been pulled 2 steps (compared to signal 492) there is no need to adjust the 1 delay buffer 434 that outputs signal 798.

The end-points 485 & 486 may benefit from being pushed 3 skew steps. Again, the signal 791 has already been pulled 2 steps (compared to signal 492). Therefore, in order to achieve a total push adjustment of 3, the buffer may be replaced with a 6 delay skew buffer 756 (BUFF #6) that outputs signal 799.

In various embodiments, other combinations of ICG and buffer delay (e.g., a 1 delay ICG, etc.) may have been employed to achieve the desired skew adjustment. It is understood that the above are merely a few illustrative examples to which the disclosed subject matter is not limited.

Returning to FIG. 2, in various embodiments, this new or adjusted digital circuit model 208 may then be reviewed or processed by other tools. For example, a static and/or dynamic timing evaluator 230 may perform a more detailed and accurate form of timing analysis on the model. In another embodiment, the physical synthesizer 230 may be employed to turn the digital circuit model 208 into a circuit physical model 292 that includes information needed to physically manufacture or at least physically layout the digital circuit.

In various embodiments, the results of these other tools 230 may be fedback through the system 200, for additional passes or to re-evaluate a modified digital circuit model 202. For example, during the design process a portion of the digital circuit model 202 may be changed (e.g., to repair faulty functionary, to fix a layout issue, to move combinatorial logic to fix a timing issue, etc.). This new digital circuit model 202 may then be re-evaluated by the system 200. As described above, as the ICGs and SBs may include the same physical dimensions or footprint (at least relative to their own variants), the system 200 may be configured to adjust the clock skew without requiring extensive re-evaluation by the other tools 230 (e.g., re-synthesizing the model 208, etc.). It is understood that the above are merely a few illustrative examples to which the disclosed subject matter is not limited.

Figure 8:
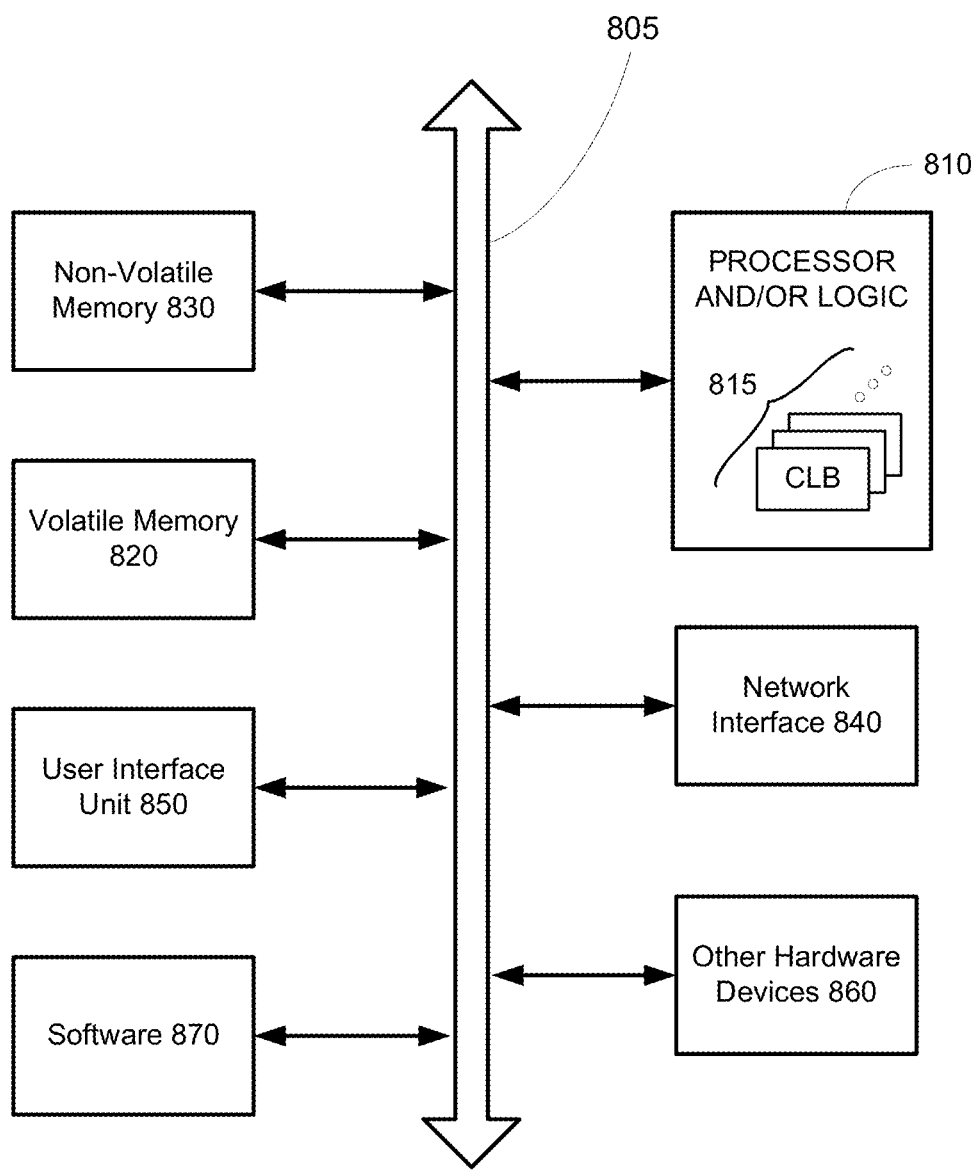
FIG. 8 is a schematic block diagram of an information processing system that may include devices formed according to principles of the disclosed subject matter.

FIG. 8 is a schematic block diagram of an information processing system 800, which may include semiconductor devices formed according to principles of the disclosed subject matter.

Referring to FIG. 8, an information processing system 800 may include one or more of devices constructed according to the principles of the disclosed subject matter. In another embodiment, the information processing system 800 may employ or execute one or more techniques according to the principles of the disclosed subject matter.

In various embodiments, the information processing system 800 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 800 may be used by a user (not shown).

The information processing system 800 according to the disclosed subject matter may further include a central processing unit (CPU), logic, or processor 810. In some embodiments, the processor 810 may include one or more functional unit blocks (FUBs) or combinational logic blocks (CLBs) 815. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 800 according to the disclosed subject matter may further include a volatile memory 820 (e.g., a Random Access Memory (RAM), etc.). The information processing system 800 according to the disclosed subject matter may further include a non-volatile memory 830 (e.g., a hard drive, an optical memory, a NAND or Flash memory, etc.). In some embodiments, either the volatile memory 820, the non-volatile memory 830, or a combination or portions thereof may be referred to as a "storage medium". In various embodiments, the volatile memory 820 and/or the non-volatile memory 830 may be configured to store data in a semi-permanent or substantially permanent form.

In various embodiments, the information processing system 800 may include one or more network interfaces 840 configured to allow the information processing system 800 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 800 according to the disclosed subject matter may further include a user interface unit 850 (e.g., a display adapter, a haptic interface, a human interface device, etc.). In various embodiments, this user interface unit 850 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 800 may include one or more other devices or hardware components 860 (e.g., a display or monitor, a keyboard, a mouse, a camera, a fingerprint reader, a video processor, etc.). It is understood that the above are merely a few illustrative examples to which the disclosed subject matter is not limited.

The information processing system 800 according to the disclosed subject matter may further include one or more system buses 805. In such an embodiment, the system bus 805 may be configured to communicatively couple the processor 810, the volatile memory 820, the non-volatile memory 830, the network interface 840, the user interface unit 850, and one or more hardware components 860. Data processed by the processor 810 or data inputted from outside of the non-volatile memory 830 may be stored in either the non-volatile memory 830 or the volatile memory 820.

In various embodiments, the information processing system 800 may include or execute one or more software components 870. In some embodiments, the software components 870 may include an operating system (OS) and/or an application. In some embodiments, the OS may be configured to provide one or more services to an application and manage or act as an intermediary between the application and the various hardware components (e.g., the processor 810, a network interface 840, etc.) of the information processing system 800. In such an embodiment, the information processing system 800 may include one or more native applications, which may be installed locally (e.g., within the non-volatile memory 830, etc.) and configured to be executed directly by the processor 810 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 810.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method comprising:
   receiving, by a computer, a digital circuit model comprising models of:
   a clock mesh configured to provide a clock signal to a plurality of logic circuits, and
   a plurality of logic circuits, each logic circuit at least partially controlled by an application of the clock signal to one or more clock-gater cells;

identifying a group of clock-gater cells having common input signals;

grouping, based at least in part upon a set of bounding dimensions, a sub-portion of the group of clock-gater cells into at least one clustered sub-portion of the group of clock-gater cells, wherein each clustered sub-portion includes a plurality of clock-gater cells;

for each clustered sub-portion, de-cloning in the digital circuit model, each of the clock-gater cells with a combination of a new clock-gater cell and at least one matching buffer cell; and manufacturing or laying out an integrated circuit based, at least in part, upon the digital circuit model.

2. The method of claim 1, wherein de-cloning comprises:

replacing each of the clock-gater cells with a respective matching buffer cell; and creating a new clock-gater cell placed, topologically, between the matching buffer cells of the clustered sub-portion and the input signals.

3. The method of claim 2, wherein replacing includes replacing the clock-gater cells with respective matching buffer cells that are footprint compatible with the clock-gater cells; and wherein creating a new clock-gater cell includes placing the new clock-gater cell in a vacant portion of the clustered sub-portion.

4. The method of claim 2, wherein creating a new clock-gater cell includes placing the new clock-gater cell substantially at a delay-weighted geometric center of the matching buffer cells.

5. The method of claim 1, further comprising tuning at least one clock related cell to adjust a delay caused by modifying a clock network.

6. The method of claim 5, wherein tuning at least one clock related cell includes tuning the new clock-gater cell.

7. The method of claim 1, wherein the bounding dimensions include:

a maximum distance in a first direction between clock-gater cells having common input signals; and a maximum distance in a second direction between clock-gater cells having common input signals.

8. The method of claim 1, wherein grouping at least one clustered sub-portion comprises:

sweeping the bounding dimensions in a plurality of direction sets;

for each direction set, counting a number of potential clustered sub-portions associated with the direction set;

determining a direction set with a least number of potential clustered sub-portions; and setting the potential clustered sub-portions associated with the determined direction set as the at least one clustered sub-portion.

9. The method of claim 1, wherein grouping at least one clustered sub-portion comprises selecting the at least one clustered sub-portion based, at least in part, upon a cluster size and a wire length.

10. An apparatus comprising:

a digital circuit receiver configured to receive a digital circuit model comprising models of:

a clock mesh configured to provide a clock signal to a plurality of logic circuits, and a plurality of logic circuits, each logic circuit at least partially controlled by an application of the clock signal to one or more clock-gater cells;

a cluster analyzer configured to:

identify a group of clock-gater cells having common input signals, and group, based at least in part upon a set of bounding dimensions, a sub-portion of the group of clock-gater cells into at least one clustered sub-portion of the group of clock-gater cells, wherein each clustered sub-portion includes a plurality of clock-gater cells;

a clock-gater de-cloner configured to, for each clustered sub-portion, de-clone in the digital circuit model the respective clock-gater cells with a combination of a new clock-gater cell and at least one matching buffer cell and a physical synthesizer configured to convert the digital circuit model to a physical circuit model employed to manufacture or layout a physical integrated circuit.

11. The apparatus of claim 10, wherein the clock-gater de-cloner is configured to:

replace each of the clock-gater cells with a respective matching buffer cell; and create a new clock-gater cell placed, topologically, between the matching buffer cells of the clustered sub-portion and the input signals.

12. The apparatus of claim 11, wherein replacing includes replacing the clock-gater cells with respective matching buffer cells that are footprint compatible with the clock-gater cells; and wherein creating a new clock-gater cell includes placing the new clock-gater cell in a vacant portion of the clustered sub-portion.

13. The apparatus of claim 11, wherein the clock-gater de-cloner is configured to place the new clock-gater cell substantially at a delay-weighted geometric center of the matching buffer cells.

14. The apparatus of claim 10, further comprising a skew adjuster configured to tune at least one clock related cell to adjust a delay caused by modifying a clock network.

15. The apparatus of claim 14, wherein the skew adjuster is configured to tune a skew of the new clock-gater cell.

16. The apparatus of claim 10, wherein the bounding dimensions include:

a maximum distance in a first direction between clock-gater cells having common input signals; and a maximum distance in a second direction between clock-gater cells having common input signals.

17. The apparatus of claim 10, wherein the cluster analyzer is configured to:

sweep the bounding dimensions in a plurality of direction sets;

for each direction set, count a number of potential clustered sub-portions associated with the direction set;

determine a direction set with a least number of potential clustered sub-portions; and establish the potential clustered sub-portions associated with the determined direction set as the at least one clustered sub-portion.

18. The apparatus of claim 10, wherein the cluster analyzer is configured to select the at least one clustered sub-portion based, at least in part, upon a cluster size and a wire length.

19. A computer program product for de-cloning clock-gater cells of a digital circuit model, the computer program product being tangibly embodied on a computer-readable medium and comprising executable code that, when executed, is configured to cause a data processing apparatus to:

receive a digital circuit model comprising models of:

a clock mesh configured to provide a clock signal to a plurality of logic circuits, and a plurality of logic circuits, each logic circuit at least partially controlled by an application of the clock signal to one or more clock-gater cells;

identify a group of clock-gater cells having common input signals;

group, based at least in part upon a set of bounding dimensions, a sub-portion of the group of clock-gater cells into at least one clustered sub-portion of the group of clock-gater cells, wherein each clustered sub-portion includes a plurality of clock-gater cells; and for each clustered sub-portion, de-clone in the digital circuit model the clock-gater cells with a combination of a new clock-gater cell and replacing each pre-existing clock-gater cell with a matching buffer cell; and convert the digital circuit model to a physical circuit model employed to manufacture or layout a physical integrated circuit.

20. The computer program product of claim 19, wherein the executable code that, when executed, is configured to cause the data processing apparatus to:

replace each of the clock-gater cells with a respective matching buffer cell; and create a new clock-gater cell placed, topologically, between the matching buffer cells of the clustered sub-portion and the input signals.

\* \* \* \* \*